United States Patent [19]

Madison

[11] Patent Number: 5,301,877

[45] Date of Patent: Apr. 12, 1994

[54] LAWN AND GARDEN SPRAYER WITH PRESS-FIT NOZZLE CONSTRUCTION

[75] Inventor: Charles H. Madison, Grand Rapids, Mich.

[73] Assignee: R L Corporation, Lowell, Mich.

[21] Appl. No.: 858,210

[22] Filed: Mar. 26, 1992

[51] Int. Cl.⁵ .............................................. B05B 15/06
[52] U.S. Cl. .................................. 239/154; 239/530; 239/600; 285/382
[58] Field of Search ............... 239/154, 354, 360, 373, 239/530, 600; 285/382; 29/525

[56] References Cited

U.S. PATENT DOCUMENTS

| | | | |
|---|---|---|---|
| 424,422 | 3/1890 | Kuehn . | |
| 869,936 | 11/1907 | Prevost | 239/360 |
| 1,177,884 | 4/1916 | Molesta et al. | 239/600 X |
| 2,267,339 | 12/1941 | Paulsen | 29/148 |
| 2,490,594 | 12/1949 | Madden | 29/525 X |
| 3,135,431 | 6/1964 | Matthewson et al. | 239/373 X |
| 3,262,177 | 7/1966 | Cobb et al. | 28/1 |
| 3,287,034 | 11/1966 | Bragg | 285/115 |
| 3,313,490 | 4/1967 | Loveland | 239/596 |
| 3,492,712 | 2/1970 | Benson | 29/157 |
| 3,758,036 | 9/1973 | Bauder et al. | 239/102 |
| 3,947,940 | 4/1976 | Augustine | 29/157 |
| 4,118,134 | 10/1978 | Mansel | 403/282 |
| 4,163,521 | 8/1979 | Rooss | 239/86 |
| 4,302,874 | 12/1981 | Colas | 29/525 X |
| 4,337,562 | 7/1982 | Flueckiger | 29/525 |
| 4,502,196 | 3/1985 | Kupper et al. | 29/157 |
| 4,790,055 | 12/1988 | Raufeisen et al. | 29/156.7 |

FOREIGN PATENT DOCUMENTS

| | | |
|---|---|---|
| 1359585 | 3/1964 | France . |
| 172146 | 12/1921 | United Kingdom . |
| 180379 | 5/1922 | United Kingdom . |
| 435700 | 9/1935 | United Kingdom ............ 29/525 |
| 596136 | 12/1947 | United Kingdom . |
| 2048122 | 12/1980 | United Kingdom ............ 239/600 |

Primary Examiner—Andres Kashnikow
Assistant Examiner—William Grant
Attorney, Agent, or Firm—Price, Heneveld, Cooper, DeWitt & Litton

[57] ABSTRACT

A lawn and garden sprayer having a tank, a hose and a dispensing wand. The dispensing wand is a tubular member having a fluid flow control valve at one end and a dispensing nozzle at the other. The dispensing nozzle is supported on a nozzle body which is press-fit into an end of the fluid dispensing tube where it is held by an interference fit to provide a fluid-tight joint. The nozzle body has a circumferential sealing surface and a knurled surface for preventing rotation of the nozzle body relative to the dispensing tube. A threaded portion is provided on the nozzle body for supporting a nozzle. A dispensing portion is covered by the nozzle and has a plurality of transverse apertures connecting to an axial fluid passage in the nozzle body to enable fluid contained in the tank to be dispensed through the nozzle.

18 Claims, 2 Drawing Sheets

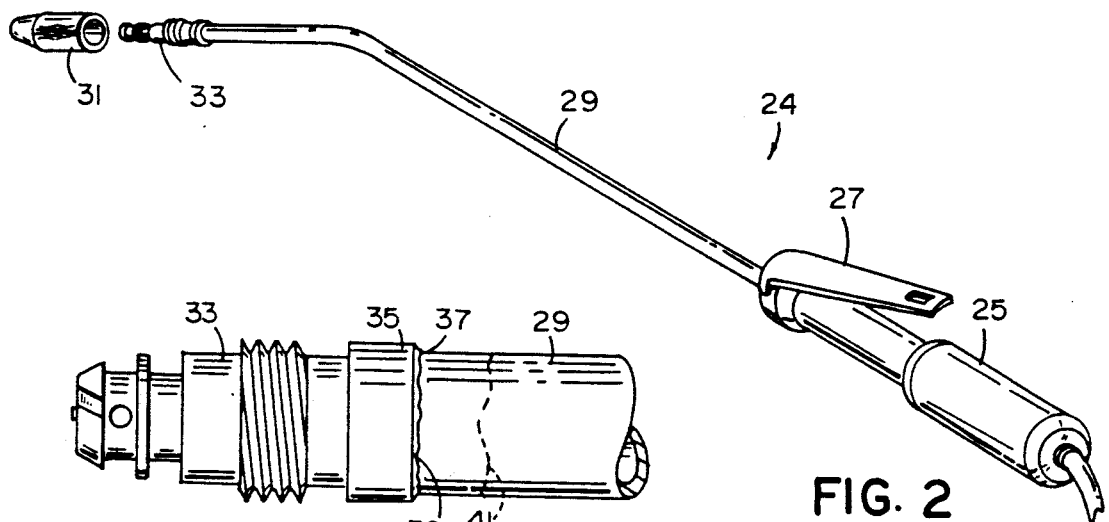
FIG. 2
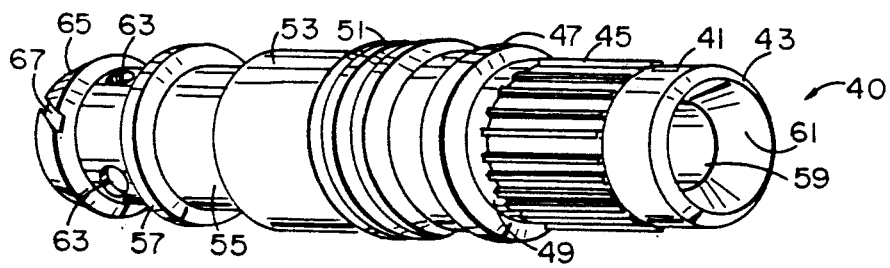
FIG. 3 (PRIOR ART)
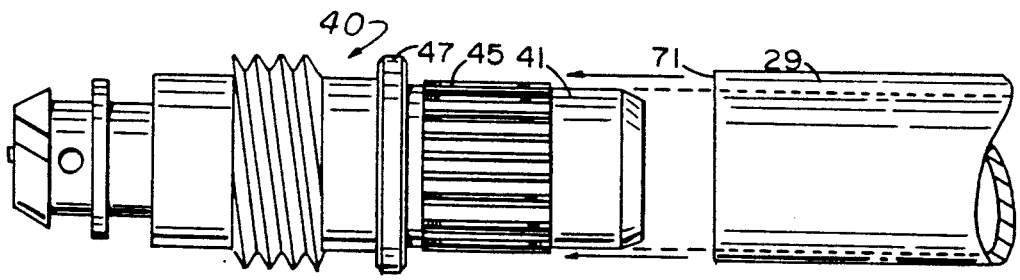
FIG. 4
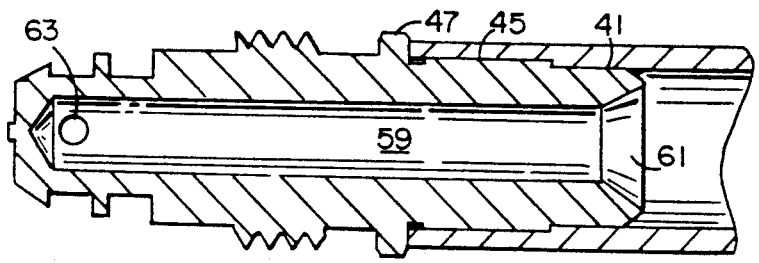
FIG. 5
FIG. 6

5,301,877

LAWN AND GARDEN SPRAYER WITH PRESS-FIT NOZZLE CONSTRUCTION

BACKGROUND OF THE INVENTION

Lawn and garden sprayers usually have a tank for supporting a liquid material to be dispensed and a flexible hose leading from the tank to a metal or plastic wand which has a hand operated valve for controlling the flow of fluid from the tank at one end and a nozzle at the other end which can be adjusted to dispense a stream or various spray patterns. When the wand is made of metal, the fittings on the wand for attaching the valve and for supporting the adjustable nozzle are usually soldered to the tubing. The soldering of the fittings requires not only skilled personnel but also specialized equipment to ventilate the fumes from the solder and flux used. In making a soldered joint, it is the preferred practice to thoroughly clean the area to be soldered. This cleaning can cause the solder to be wicked out of the solder joint forming an aesthetically undesirable joint and also a joint with a potential for leaking. Also, in raising the temperature of the parts high enough for the solder to flow freely, the fittings and the tubing can become discolored. All in all, it is a very difficult procedure to prepare an aesthetically pleasing dispensing wand.

Also, it frequently happens in the use of a lawn and garden sprayer that the nozzle will be excessively tightened by the user. It then becomes necessary to use a pair of pliers or a wrench to remove the nozzle from the wand. If the nozzle supporting member has not been properly soldered to the wand and if, for example, the solder has been wicked out of the connection, it is possible for the nozzle supporting fitting to loosen under the applied pressure or at least to weaken the joint sufficiently so that it will leak when the wand is used to dispense lawn and garden chemicals.

SUMMARY OF THE INVENTION

In accordance with the present invention, an improved lawn and garden sprayer is disclosed having a tank, a flexible hose and a tubular dispensing wand. The wand has a valve at one end and a nozzle supporting member at the other end. The nozzle supporting member is press-fit into the dispensing wand. The nozzle support member has a substantially smooth circumferential portion for forming a fluid-tight seal against the inner wall of the tubular dispensing wand and a textured portion adjacent the smooth portion for inhibiting rotation of the nozzle support member relative to the dispensing wand. The nozzle supporting member also has a threaded portion for supporting a nozzle and an axial fluid passage leading from the input of the nozzle support member to a plurality of spaced transverse apertures which enable liquid to flow through the nozzle support member to the interior of a supported nozzle for dispersion.

BRIEF DESCRIPTION OF THE DRAWINGS

FIG. 2 is an exploded perspective view of the dispensing wand of the lawn and garden sprayer showing the nozzle separated from the nozzle supporting member;

FIG. 3 is a fragmentary elevational view of a prior art nozzle support soldered to the end of a dispensing wand;

FIG. 4 is a perspective view of the improved nozzle support of the present invention;

FIG. 5 is a side elevational view showing the nozzle support aligned with the end of a dispensing wand; and FIG. 6 is a sectional view showing the nozzle support in place in the end of a dispensing wand.

DETAILED DESCRIPTION OF THE PREFERRED EMBODIMENTS

Figure 1:
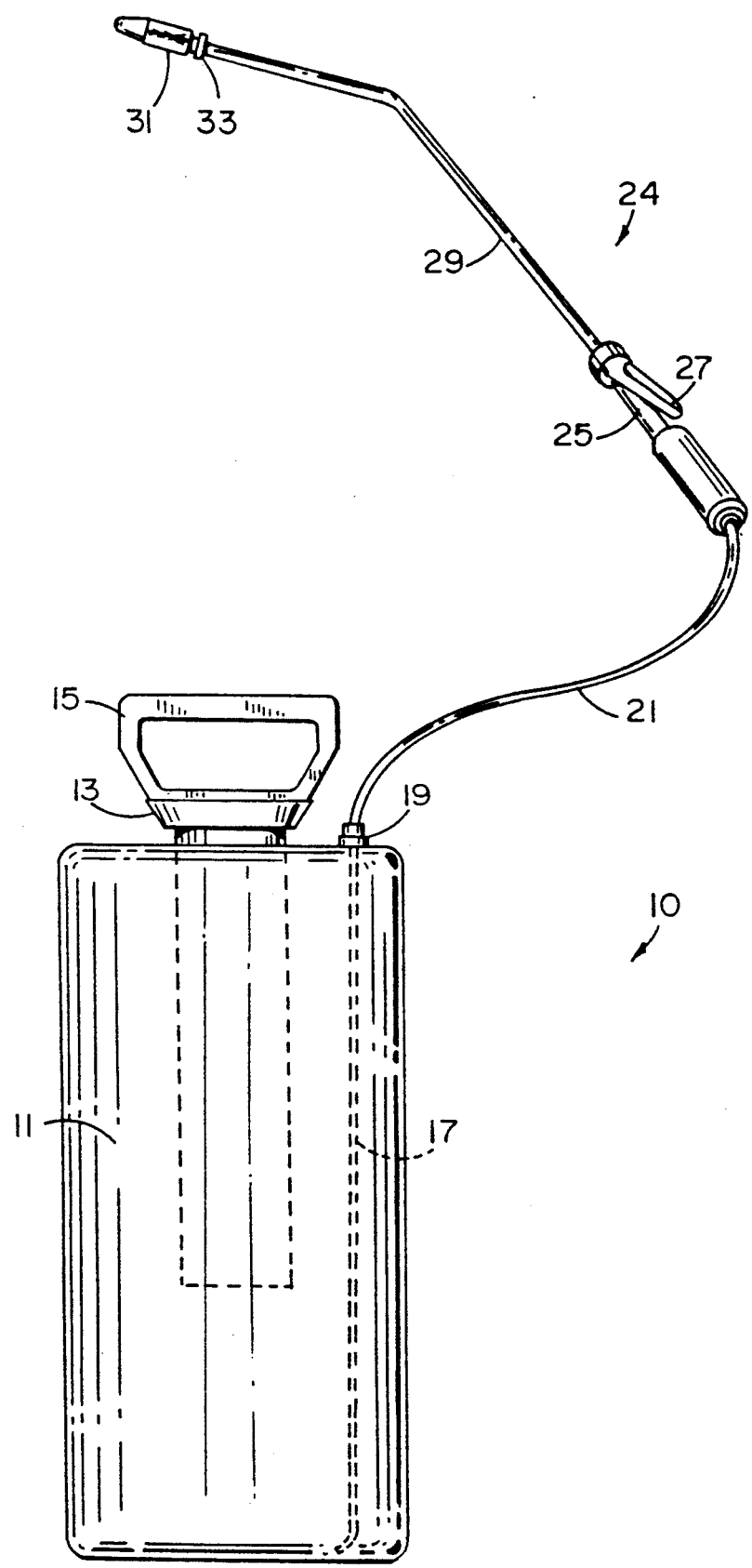
FIG. 1 is a perspective view of a lawn and garden sprayer having a tank, a flexible hose and a dispensing wand including a control valve and a nozzle adjustably mounted on a nozzle support.

Referring to FIG. 1, a lawn and garden sprayer is indicated by the number 10. The sprayer has a tank 11 which can be made of metal but is preferably made of plastic for safety reasons and for improved compatibility with the chemical solutions to be dispensed from the sprayer. Tank 11 has an open neck 13 which supports a combination pump and closure member 15. Member 15 is a hand pump which can be used to pressurize tank 11 to force the liquid solution from the tank. A tube 17 depends from a fitting 19 and is used to convey the liquid material up and out of the tank into a flexible hose 21. Hose 21 is attached to a wand assembly 24 and has a valve 25 connected to hose 21. A hand operated member 27 controls the flow of liquid through valve 25 into tubular member 29 and on to nozzle 31 which is supported on the end of dispensing tube 29. Nozzle 31 is adjustably mounted on a nozzle body 33 which is attached to the end of dispensing tube 29.

In operating the lawn and garden sprayer the chemical solution can be mixed outside or inside tank 11. The components can be poured in through opening 13. After the tank is filled with the proper amount of liquid material, hand pump/closure member 15 is used to close input 13. The hand pump can then be operated several times to pressurize tank 11. When operating handle 27 is compressed toward valve 25, the liquid in tank 11 will flow into tube 17 and then into flexible hose 21 through fitting 19. Valve 25 controls the flow of fluid into dispensing tube 29 and on to adjustable nozzle 31. Nozzle 31 can be adjusted to provide a single stream or varying size spray patterns.

It has been customary practice in the past (FIG. 3) to make nozzle supporting member 33 with an enlarged cup-shaped end 35 for fitting over the end of dispensing tube 29. The end of the dispensing tube and the interior of cup-shaped portion 35 would be thoroughly cleaned and would then have a flux material applied before the two pieces were mechanically brought together. The two pieces would then be heated above the melting point of solder and solder 37 would be allowed to flow into the space between the outer wall of dispensing tube 29 and the inner wall of cup-shaped portion 35 to form a mechanical and fluid-tight joint between nozzle holding member 33 and dispensing tube 29. It is very important in the assembly of the dispensing wand that this joint be aesthetically attractive so that a customer, in examining the lawn and garden sprayer, would see that it is a quality product. In the past, this has been very difficult to accomplish using solder since the solder would have a tendency to be drawn along, or wick along, the surface of dispensing tube 29, as shown at 39. Also, the heating of the end of the dispensing tube caused the dispensing tube to change color 41 due to vaporization of the metal and reaction with the air surrounding the wand during the soldering process.

The making of a good solder joint required careful preparation of the parts, the use of an acid flux and the use of lead-based solder. All of these materials would be heated and would tend to vaporize. Ventilation equipment was then required to remove these potentially toxic fumes to protect the skilled operators from illness. A skilled operator was required to make the soldered joints in view of the solder wicking problem and the tube discoloration problem created by excessive heating.

In order to overcome the aforementioned problems (FIG. 4), an improved nozzle holding or support member 40 is shown. Nozzle holding member 40 has a substantially smooth circumferential surface portion 41 adjacent a lead chamfered edge 43 which is at an approximate 30° angle. Adjacent the smooth surface 41 is a textured or knurled surface 45. A circumferential stop 47 is spaced slightly from knurled portion 45. Nozzle support member 40 is preferably made of brass and can be shaped on a multi-position screw machine. The small space 49 provided between knurled portion 45 and stop 47 facilitates the manufacture of the part by providing room for the screw machine tools. It has been observed that the brass edges in the knurled portion become hardened due to the cold working. Moving to the left, as shown in FIG. 4, a threaded portion 51 is formed on the surface of a tubular portion 53. A recessed portion 55 is formed for supporting an O-ring (not shown) between the end of tubular portion 53 and a flange 57. Nozzle holding member 40 has an axial bore 59 which is approached by a sloping surface 61 which facilitates the flow of fluid into the nozzle support member. At the remote end from surface 61, a plurality of transverse apertures 63 are provided which lead into axial bore 59. A head 65 is formed on the end of the nozzle support member. Three angular slots 67, only one of which is shown, are provided in head 65. These slots cause the liquid passing out of aperture 63 to strike the inside of nozzle 31 at an angle which tends to cause the liquid to spiral within the nozzle which assists in the generation of a spray pattern.

Nozzle support member 40 has two major portions. An insertion portion consists of substantially smooth circumferential portion 41 and textured or knurled portion 45. Tube 29 is preferably made of brass which is extruded to form the tube. These portions are press-fit into the end of the dispensing tube, as shown in FIG. 5. Surface 41 forms a liquid-tight interference fit against the inner wall of dispensing tube 29. Knurled surface 45 has a plurality of axial straight edges which are forced into the inner wall of dispensing tube 29. The metal forming the inner wall tends to cold flow into the space between the raised edges of the knurled pattern to lock nozzle support 40 firmly in place in the end of the dispensing tube. Nozzle support member 40 is forced into the dispensing tube until edge 71 abuts the face of circumferential stop 47.

An embodiment of nozzle support member 40 is approximately 1 inch in length and approximately 0.4 inch in diameter at the circumferential stop. The knurled surface portion is approximately one-quarter inch long and the smooth circumferential band is slightly less than one-quarter inch in length. The insertion portion of the nozzle support member which is to be inserted in the brass tubing is machined to 0.270+0.001 inch in diameter. The inner diameter of the brass tubing is nominally 0.268 inch. The brass tubing is normally extruded to very close tolerances, usually +0 and −0.001 inch in inside diameter. Due to the knurling process, straight axial edges are produced which extend slightly beyond the diameter of the smooth band. A nozzle supporting portion of nozzle support member 40 is larger than the insertion portion which is to be press-fit into the brass tube. The nozzle supporting portion has approximately four threads for adjustably supporting a nozzle, has four traverse apertures 63 spaced approximately 90° leading to the axial bore, and has head 65 with three slots 67 set at an angle of approximately 30° and spaced approximately 120°. The above-described dimensions are representative of a working nozzle support member 40. Obviously these dimensions can be varied for different sizes of brass tubing and for different applications. It is recommended that care be exercised in the manufacture of those portions of the nozzle support member 40 that are to be press-fit into the brass tubing since these portions form the fluid-tight seal and mechanical lock with the brass tubing. It is preferred that the insertion portion of the nozzle support member 40 to be inserted in the brass tubing be slightly larger in diameter than the inner diameter of the brass tubing.

By using the press-fit mounted nozzle support member 40 of the present invention, no solder or heating is necessary to form a fluid-tight, mechanically fixed joint. Dispensing tube 29 abuts circumferential stop 47 forming an aesthetically attractive dispensing wand. The improved dispensing wand is then used in combination with a tank and flexible hose to provide an improved lawn and garden sprayer of improved appearance and strength. If the nozzle is inadvertently tightened excessively on nozzle support member 40, the nozzle support member will not easily come loose if a pair of pliers or a wrench is used to loosen the nozzle.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. A lawn and garden sprayer comprising:
   a tank for holding a reservoir of fluid to be dispensed;
   a wand connected in fluid communication with said tank for dispensing the fluid, said wand having a rigid tubular member defining a fluid passage, said wand having an aperture defining an inner diameter extending from said passage, through said rigid tubular member, to an outside of said wand;
   a nozzle connected with said rigid tubular member; and
   a nozzle support member interposed between said rigid tubular member and said nozzle, said nozzle support member having an axial bore connected in fluid communication between said passage of said rigid tubular member and said nozzle, having an insert portion received in press-fit engagement in said aperture through said rigid tubular member, and having a nozzle support portion adapted to receive said nozzle in slip fit engagement, said nozzle engaging said nozzle support portion, said insert portion including means located on a circumferential wall of said insert portion for sealing and inhibiting rotation of said nozzle support member within said wand, said means comprising:

a substantially smooth portion having a larger outer diameter than the inner diameter of a corresponding portion of said wand such that a fluid-tight seal is formed therebetween upon assembly of said nozzle support member to said rigid tubular member;

a textured portion having a larger diameter than the inner diameter of a corresponding portion of said wand such that rotation of said nozzle support member within said wand is inhibited upon assembly of said nozzle support member to said rigid tubular member;

said smooth portion and said textured portion combining to prevent separation of said nozzle support member from said wand due to rotation of said nozzle support member with respect to said wand.

2. A sprayer as set forth in claim 1, wherein said nozzle support portion includes:

a threaded portion threadedly supporting said nozzle; and a dispensing portion adjacent said threaded portion, said dispensing portion including at least one aperture providing a fluid passage from said axial bore in said nozzle support member to an outside surface of said dispensing portion.

3. A lawn and garden sprayer comprising:

a tank for holding a reservoir of fluid to be dispensed;

a wand connected in fluid communication with said tank for dispensing the fluid, said wand having a rigid tubular member defining a fluid passage and a circumferential wall, said wand having an aperture extending from said passage, through said rigid tubular member, to an outside of said wand;

a nozzle connected with said rigid tubular member;

a nozzle support member interposed between said rigid tubular member and said nozzle, said nozzle support member having an axial bore connected in fluid communication between said passage of said rigid tubular member and said nozzle, having an insert portion received in press-fit engagement with said rigid tubular member, and having a nozzle support portion including a threaded portion adapted to receive said nozzle in slip fit engagement, said nozzle including mating threads for engaging said threaded portion of said nozzle support portion;

said insert portion of said nozzle support member including:

a substantially smooth circumferential portion having a diameter forming a fluid-tight seal and an interference fit between said nozzle support member and said circumferential wall of said rigid tubular member; and a textured portion adjacent and located generally on the same surface as said substantially smooth circumferential portion, said textured portion defining a diameter forming an interference fit with said circumferential wall of said rigid tubular member and inhibiting rotation of said nozzle support member relative to said rigid tubular member, said smooth circumferential portion and said textured portion being configured to provide a leak-free joint with said rigid tubular member that prevents accidental loosening of said nozzle support member on said wand due to rotation of said nozzle support member with respect to said wand.

4. A sprayer as set forth in claim 3, wherein said textured portion of said nozzle support member has a knurled surface configuration including a plurality of axial straight edges.

5. A nozzle body for supporting a nozzle on a dispensing tube, comprising:

a tubular member having an axial bore therein, said tubular member being inserted into an end of a rigid dispensing tube, said rigid dispensing tube defining an inner diameter, said tubular member including:

a nozzle support portion configured to receive a nozzle; and means for sealingly engaging said rigid dispensing tube including a substantially smooth circumferential portion having a larger outer diameter than said inner diameter of said rigid dispensing tube for forming a fluid-tight seal between said tubular member and said rigid dispensing tube when assembled thereto; and means located proximate said engaging means for inhibiting rotation of said tubular member relative to said rigid dispensing tube including a textured portion on said tubular member, adjacent said circumferential portion, said textured portion defining a larger outer diameter than said inner diameter of said rigid dispensing tube for frictionally inhibiting rotation of said tubular member in said dispensing tube, said smooth circumferential portion and said textured portion being configured to provide a leak-free joint with said rigid dispensing tube when assembled thereto that prevents separation of said tubular member from said rigid dispensing tube and that is structurally sufficiently strong to prevent accidental loosening even if said nozzle is removed after being tightly secured on said nozzle support portion.

6. A nozzle body as set forth in claim 5, wherein said textured portion of said tubular member is knurled.

7. A nozzle body as set forth in claim 5, including a circumferential stop portion for abutting the end of said dispensing tube when said tubular member is inserted therein.

8. A nozzle body as set forth in claim 7, including:

a threaded portion adjacent said stop portion for threadedly supporting said nozzle; and a dispensing portion adjacent said threaded portion, said dispensing portion having at least one aperture therein providing a fluid connection to said axial bore in said tubular member.

9. A nozzle support for a dispensing tube having a passageway defining an inner diameter, comprising:

a tubular member having an insert portion received within the dispensing tube, a dispensing portion projecting from the dispensing tube, and an axial fluid passage therein;

said insert portion of said tubular member including a substantially smooth circumferential portion having an outer diameter large enough to form a fluid-tight seal with the inner diameter of the dispensing tube and including a textured portion, adjacent and generally axially aligned with said circumferential portion, said textured portion defining an outer diameter large enough to interferingly engage the inner diameter of said dispensing tube for inhibiting rotation of said tubular member relative to the dispensing tube upon assembly thereto; and said dispensing portion including a threaded portion for supporting a nozzle and at least one aperture leading to said axial fluid passage in said tubular member, said smooth circumferential portion and said textured portion being configured to provide a leak-free joint with said dispensing tube that is structurally strong enough to prevent separation of said tubular member from said dispensing tube even if said nozzle is forcibly rotatingly removed after being tightly secured on said threaded portion.

10. A nozzle support for a dispensing tube as set forth in claim 9, including a raised circumferential portion forming a shoulder, said shoulder abutting an end of the dispensing tube.

11. A dispensing wand for liquid materials, comprising:
   a nozzle;
   a rigid tubular member defining an inner diameter; and
   a nozzle support member having an axial fluid passage, having an insert portion press-fit into said rigid tubular member, and having a dispensing portion supporting said nozzle, said insert portion of said nozzle support member including means for sealing and inhibiting rotation of the nozzle support member within said rigid tubular member comprising:
   a substantially smooth portion having a larger outer diameter than the inner diameter of a corresponding portion of said rigid tubular member such that a fluid-tight seal is formed therebetween upon assembly of said nozzle support member to said rigid tubular member;
   a textured portion having a larger diameter than the inner diameter of a corresponding portion of said rigid tubular member such that rotation of said nozzle support member within said rigid tubular member is inhibited upon assembly of said nozzle support member to said rigid tubular member;
   said smooth portion and said textured portion being located on a common surface and combining to prevent separation of said nozzle support member from said rigid tubular member due to rotation of said nozzle support member with respect to said rigid tubular member.

12. A dispensing wand for liquid materials as set forth in claim 11, wherein said textured portion of said nozzle support member has a knurled surface configuration including a plurality of axial straight edges.

13. A dispensing wand for liquid material as set forth in claim 11, wherein said dispensing portion includes:
   a threaded section threadedly supporting the nozzle; and
   a dispensing section adjacent said threaded section, said dispensing section including at least one aperture providing a fluid passage from the axial fluid passage in said nozzle support member to the outside surface of said dispensing section.

14. A dispensing wand for liquid materials, comprising:
   a rigid tubular member having a wall defining an end;
   a dispensing valve operatively connected with said rigid tubular member for controlling a flow of liquid through said dispensing wand; and
   a nozzle supporting member in said end of said rigid tubular member, said nozzle supporting member comprising:
   an elongated member having a first end, an opposing second end, and an axial bore therein:
   a substantially smooth circumferential surface portion, adjacent the first end of said elongated member, having a diameter sized to create an interference fit liquid-tight seal between said elongated member and the wall of said rigid tubular member when pressed together;
   a textured circumferential portion, adjacent and located generally on the same surface as said substantially smooth circumferential surface portion, said textured circumferential portion defining a diameter sized to interferingly engage the wall of said rigid tubular member and thus inhibit rotation of said elongated member relative to said rigid tubular member when pressed together; and
   a threaded portion, near the second end of said elongated member, supporting a nozzle on said nozzle supporting member, said smooth circumferential portion and said textured portion being configured to provide a leak-free joint with said tubular member that is structurally strong enough to prevent separation of said nozzle supporting member from said rigid tubular member due to rotation of said nozzle supporting member with respect to said rigid tubular member even if said nozzle is forcibly removed after being tightly secured on said threaded portion.

15. A lawn and garden sprayer comprising:
   a tank for containing a material to be sprayed;
   a hose connected to said tank;
   a dispensing wand connected to said hose, said dispensing wand including:
   a rigid elongated member having an axial bore therein;
   a nozzle support member having an axial fluid passage connected with said axial bore of said rigid elongated member, having an insert portion press-fit into said rigid elongated member to form a leak-free joint, and having a dispensing portion, said insert portion including a smooth portion having a larger outer diameter than that of the axial bore of said rigid elongated member such that a fluid-tight seal is formed therebetween upon assembly, and an adjacent textured portion also having a larger outer diameter than that of the axial bore of said rigid elongated member to frictionally engage the axial bore for preventing rotation of said nozzle support member in said rigid elongated member once assembled; and
   a nozzle configured to releasably twistingly engage said dispensing portion in leak-free engagement.

16. A lawn and garden sprayer as set forth in claim 15, wherein said textured portion of said nozzle support member has a knurled surface configuration.

17. A lawn and garden sprayer as set forth in claim 15, wherein said dispensing portion includes:
   a threaded portion threadedly supporting said nozzle; and
   at least one aperture providing a fluid passage from said axial fluid passage in said nozzle support member to an outside surface of said dispensing portion.

18. A lawn and garden sprayer comprising:
   a tank for containing a material to be sprayed;
   a hose connected to said tank; and
   a dispensing wand connected to said hose, said dispensing wand including:
   a rigid tubular member;

an elongated member having a first end press-fit into said rigid tubular member; an opposing second end; an axial bore therein; said first end including an outer wall surface having a substantially smooth circumferential surface portion, adjacent said first end of said elongated member with a large enough diameter to sealingly interferingly engage the inner wall of said tubular member to thus provide a liquid-tight seal between said elongated member and the inner wall of said rigid tubular member; a textured circumferential portion, adjacent said substantially smooth circumferential surface portion, defining a large enough diameter to frictionally interferingly engage the inner wall of said tubular member to thus inhibit rotation of said elongated member relative to said rigid tubular member; and a threaded portion, near said second end of said elongated member;

a nozzle releasably engaging said threaded portion on said elongated member, said smooth circumferential surface portion and said textured circumferential portion forming a liquid-tight joint that is structurally sufficiently strong to prevent separation of said elongated member from said rigid tubular member even if said nozzle is forcibly removed from said threaded portion; and a dispensing valve on an end of said rigid tubular member for controlling the flow of liquid through said dispensing wand.

* * * * *